(12) United States Patent
Johnston

(10) Patent No.: US 7,281,689 B1
(45) Date of Patent: Oct. 16, 2007

(54) PIPE SUPPORT ASSEMBLY

(76) Inventor: Michael R Johnston, 2082 Northside Dr., Twin Lake, MI (US) 49457

( * ) Notice: Subject to any disclaimer, the term of this patent is extended or adjusted under 35 U.S.C. 154(b) by 164 days.

(21) Appl. No.: 10/983,987

(22) Filed: Nov. 8, 2004

Related U.S. Application Data

(60) Provisional application No. 60/524,248, filed on Nov. 21, 2003.

(51) Int. Cl.
  *E21F 17/02* (2006.01)
  *F16L 3/00* (2006.01)

(52) U.S. Cl. .......................... 248/58; 248/61; 248/62; 248/74.3; 248/74.1; 248/49

(58) Field of Classification Search ................. 248/58, 248/61, 62, 74.3, 74.1, 49
See application file for complete search history.

(56) References Cited

U.S. PATENT DOCUMENTS

| | | | | |
|---|---|---|---|---|
| 801,409 | A * | 10/1905 | Smith | 248/60 |
| 824,544 | A * | 6/1906 | Hossege | 248/58 |
| 1,332,796 | A * | 3/1920 | Brewer | 248/60 |
| 2,290,139 | A * | 7/1942 | Buchanan | 248/58 |
| 3,051,424 | A * | 8/1962 | Duhamel | 248/62 |
| 3,771,751 | A * | 11/1973 | Derivaz | 248/74.3 |
| 3,933,377 | A * | 1/1976 | Arrowood | 285/61 |
| 4,252,289 | A * | 2/1981 | Herb | 248/62 |
| 4,413,799 | A * | 11/1983 | Gabriel | 248/59 |
| 4,447,934 | A * | 5/1984 | Anscher | 24/16 PB |
| 4,473,205 | A * | 9/1984 | Rumble | 248/58 |
| 4,609,171 | A * | 9/1986 | Matsui | 248/74.3 |
| 4,744,535 | A * | 5/1988 | Patenaude | 248/74.1 |
| 5,215,281 | A * | 6/1993 | Sherman | 248/74.1 |
| 5,263,671 | A * | 11/1993 | Baum | 248/68.1 |
| 5,344,108 | A * | 9/1994 | Heath | 248/62 |
| 5,423,501 | A * | 6/1995 | Yu | 248/61 |
| 5,702,077 | A * | 12/1997 | Heath | 248/59 |
| 5,845,037 | A * | 12/1998 | Miekis | 385/136 |

(Continued)

FOREIGN PATENT DOCUMENTS

JP 2001-028433 A 1/2001

(Continued)

OTHER PUBLICATIONS

Communication from Japanese Patent Office regarding corresponding application.

*Primary Examiner*—Carl D. Friedman
*Assistant Examiner*—Michael McDuffie
(74) *Attorney, Agent, or Firm*—Van Dyke, Gardner, Linn & Burkhart, LLP

(57) ABSTRACT

A pipe support assembly for supporting a section of pipe from an overhead structure includes at least one support portion and a hanging element or strap for hanging the support portion or portions from the overhead structure. At least one of the support portions defines a pipe support surface for supporting the section of pipe. The support portions may be engagable together to retain the hanging element therebetween. The hanging element may be retained along and between grooves extending at least partially along at least one portion of the support portions. At least one end or portion of the hanging element is securable to the overhead structure to hang the support portion or portions and the section of pipe from the overhead structure.

25 Claims, 5 Drawing Sheets

U.S. PATENT DOCUMENTS 5,941,483 A * 8/1999 Baginski ............... 248/68.1
6,079,673 A * 6/2000 Cox ...................... 248/63
6,079,674 A * 6/2000 Snyder ................. 248/62
6,126,119 A * 10/2000 Giangrasso ........... 248/58
6,135,398 A * 10/2000 Quesnel ............... 248/74.1
6,431,502 B1 * 8/2002 Goodman ............. 248/74.1
6,513,766 B1 * 2/2003 Gretz ................... 248/74.1

FOREIGN PATENT DOCUMENTS

JP        2001-160620 A    6/2001

* cited by examiner

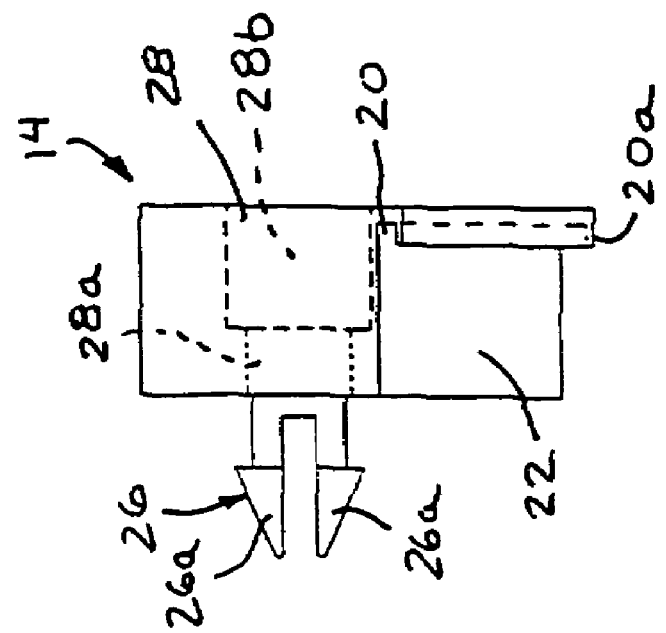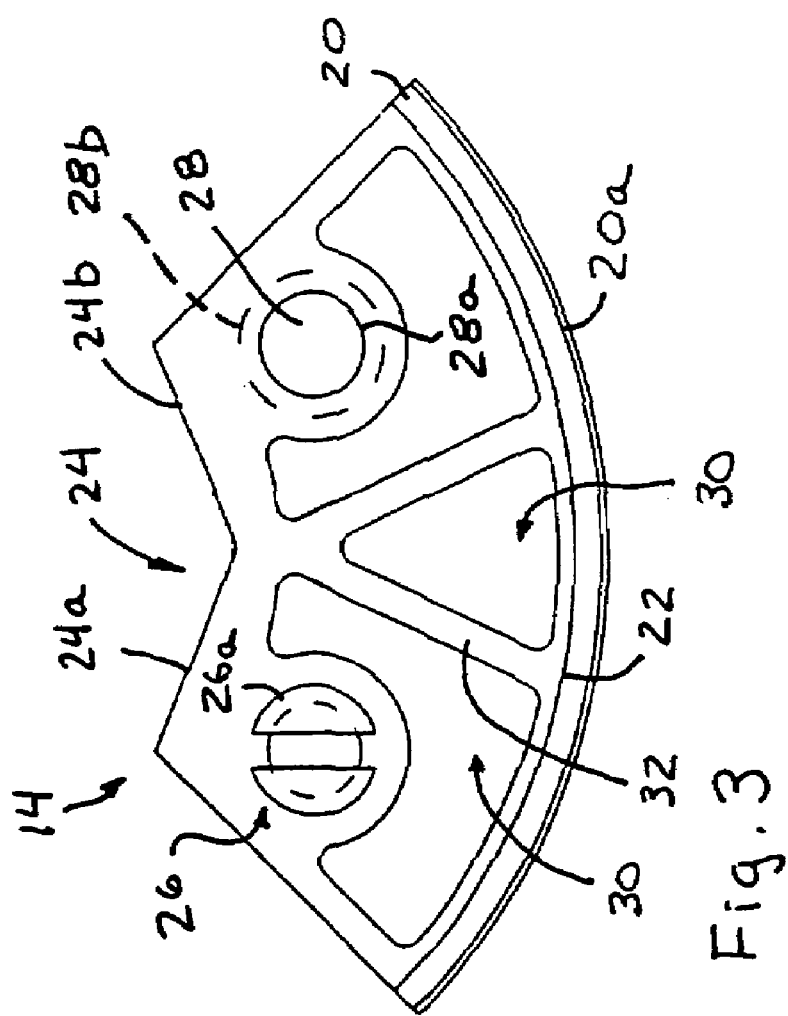

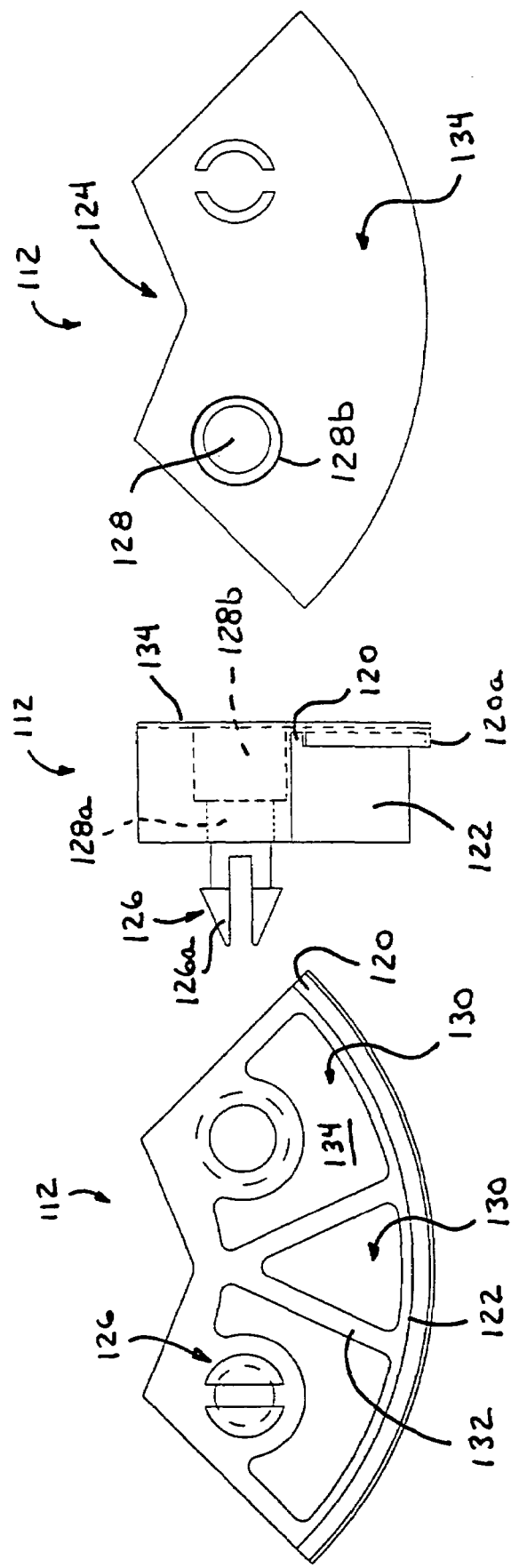

PIPE SUPPORT ASSEMBLY

CROSS REFERENCE TO RELATED APPLICATION

The present application claims benefit of U.S. provisional application, Ser. No. 60/524,248, filed Nov. 21, 2003, which is hereby incorporated herein by reference in its entirety.

FIELD OF THE INVENTION

The present invention relates generally to a holder or a support for supporting a section of pipe from an overhead structure.

BACKGROUND OF THE INVENTION

During construction of a building, pipes, such as copper pipes for water or iron pipes for gas or the like, may be hung or supported from an overhead structure or ceiling of the building. The pipes are typically hung by a metal strap or the like that is connected to a joist or overhead structure and that wraps under the pipe at various locations along the pipe to support the pipe relative to the overhead structure. Typically, a wooden block is positioned generally beneath the section of pipe and between the pipe and the metal strap to prevent the metal on metal contact of the pipe and the metal strap. It is often difficult to hold the wooden block in place while hanging the pipe due to the tendency of the wooden block to fall off of the metal strap prior to the pipe and strap being positioned against one another. Often, the wooden block must be taped or otherwise held in place while the strap is wrapped under the pipe and secured to the overhead structure. The process of hanging the pipe thus is often a manual labor-intensive process.

Therefore, there is a need in the art for an improved means for hanging pipes from an overhead structure.

SUMMARY OF THE INVENTION

The present invention provides a pipe support assembly for supporting a section of pipe at an overhead structure of a building or the like. The pipe support assembly includes two halves or parts or members or portions that may be snapped together about a portion of a hanging strap or element, such that the strap is held in place between the two parts and the snapped together parts are retained on the strap. The support assembly, when assembled, may be positioned generally beneath a section of pipe, such that the pipe rests on a support surface defined by one or both of the joined parts, and the end or ends of the strap may be secured to an overhead structure to hang the pipe from the overhead structure.

According to an aspect of the present invention, a pipe support assembly for supporting a section of pipe from an overhead structure includes a first support portion or member, a second support portion or member and a hanging element or strap. The first support member has a first groove, while the second support member has a second groove. The first and second support members are engagable or joinable and may cooperate to define a pipe support surface. The first and second grooves receive opposite sides of the hanging element and retain the hanging element between the first and second support members when the first and second support members are engaged or secured or joined together. The hanging element may hang the engaged or joined first and second support members from the overhead structure. At least one end or portion of the hanging element may be securable to the overhead structure to hang the joined support members and the section of pipe from the overhead structure.

The first and second support members may comprise common members and may be joined via a snap connection. The grooves along the support members may be generally curved or arcuately shaped along a portion of the support members, such as along a lower portion of the support members. Optionally, the grooves may be curved or generally straight along a lower portion and/or opposite side portions of the support members.

The pipe support surface may comprise a generally V-shaped support surface to accommodate pipes having different diameters. The first support member may define a first support surface and the second support member may define a second support surface, whereby the first and second support surfaces cooperate to define the pipe support surface for supporting the section of pipe. Optionally, the support members may be different parts and may have a support surface defined on one or both of the support members.

According to another aspect of the present invention, a pipe support assembly for supporting a section of pipe from an overhead structure includes at least one polymeric support portion or member and a hanging element or strap for hanging the support portion from the overhead structure. The support portion defines a pipe support surface for supporting the section of pipe and a retaining portion. The retaining portion of the support portion receives at least a portion of the hanging element and retains the hanging element at the support portion. At least one end or portion of the hanging element is securable to the overhead structure to hang the support portion and the section of pipe from the overhead structure.

Therefore, the present invention provides a pipe support assembly for supporting a pipe at an overhead structure of a building or the like. The pipe support assembly may be readily assembled together and functions to secure the pipe support portions or members to a hanging element or strap, such that the pipe support assembly may be readily positioned at a desired location along a section of pipe and the hanging element may be readily attached to or secured to the overhead structure to hang the support portions or members and the section of pipe from the overhead structure. The pipe support assembly of the present invention thus avoids the additional step of having to manually hold a block or spacer or the like between a hanging strap and a section of pipe, while the hanging strap is positioned at the desired location and secured to the overhead structure. The present invention thus provides an enhanced pipe support or pipe hanging assembly and an improved pipe hanging process or method, which reduces the manual labor involved in hanging or supporting a pipe from an overhead structure.

These and other objects, advantages, purposes and features of the present invention will become apparent upon review of the following specification in conjunction with the drawings.

BRIEF DESCRIPTION OF THE DRAWINGS

FIG. 3 is an end elevation of one of the support members of the pipe support assembly of FIGS. 1 and 2;

FIG. 4 is a side elevation of the support member of FIG. 3;

FIG. 5 is an end elevation of another support member of a pipe support assembly of the present invention;

FIG. 6 is a side elevation of the support member of FIG. 5;

FIG. 7 is an end elevation of the support member of FIGS. 5 and 6, showing the opposite end from the end shown in FIG. 5;

DESCRIPTION OF THE PREFERRED EMBODIMENTS

Figure 1:
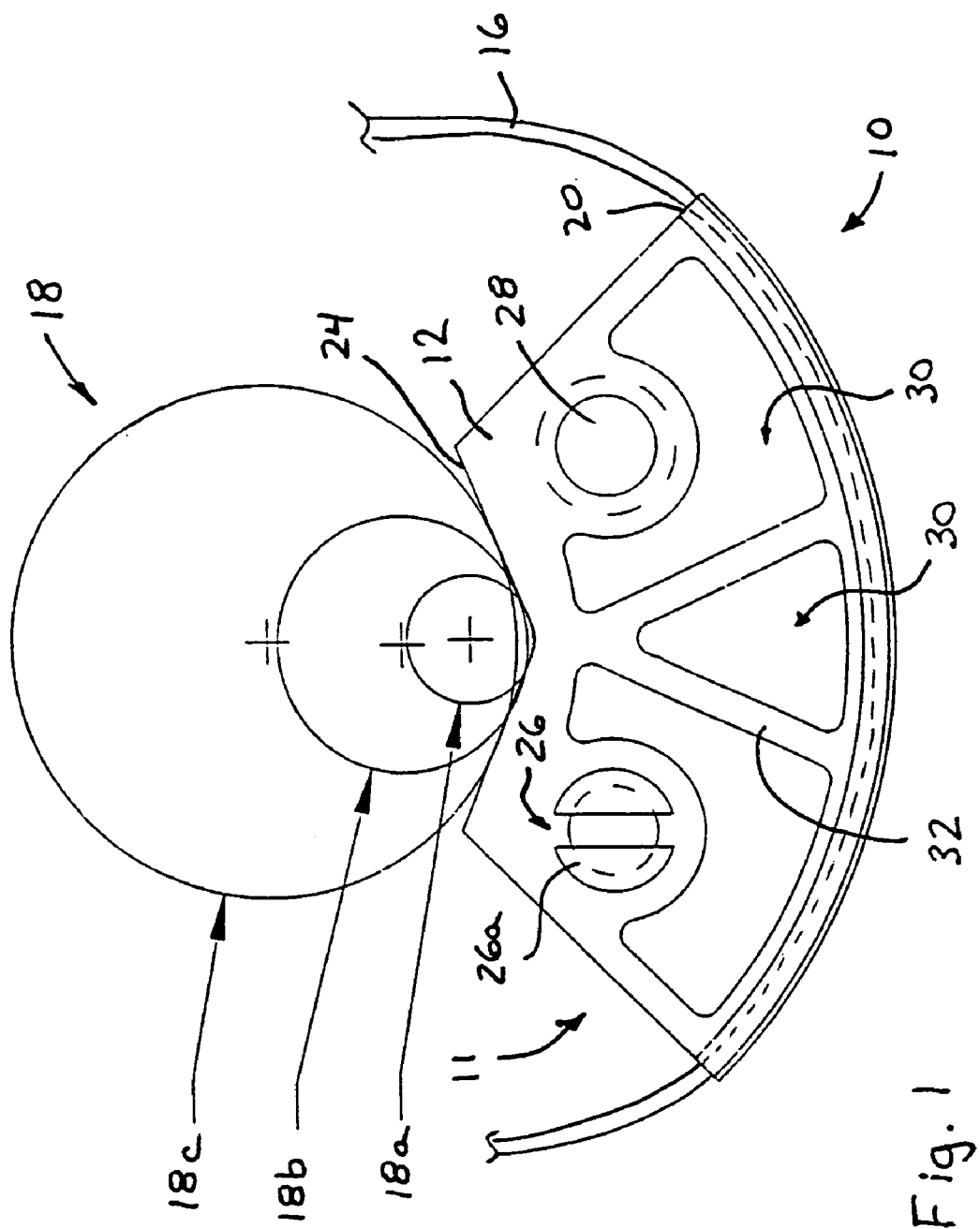
FIG. 1 is an end elevation of a pipe support assembly in accordance with the present invention, showing the pipe support assembly supporting pipes of various sized diameters.
Figure 2:
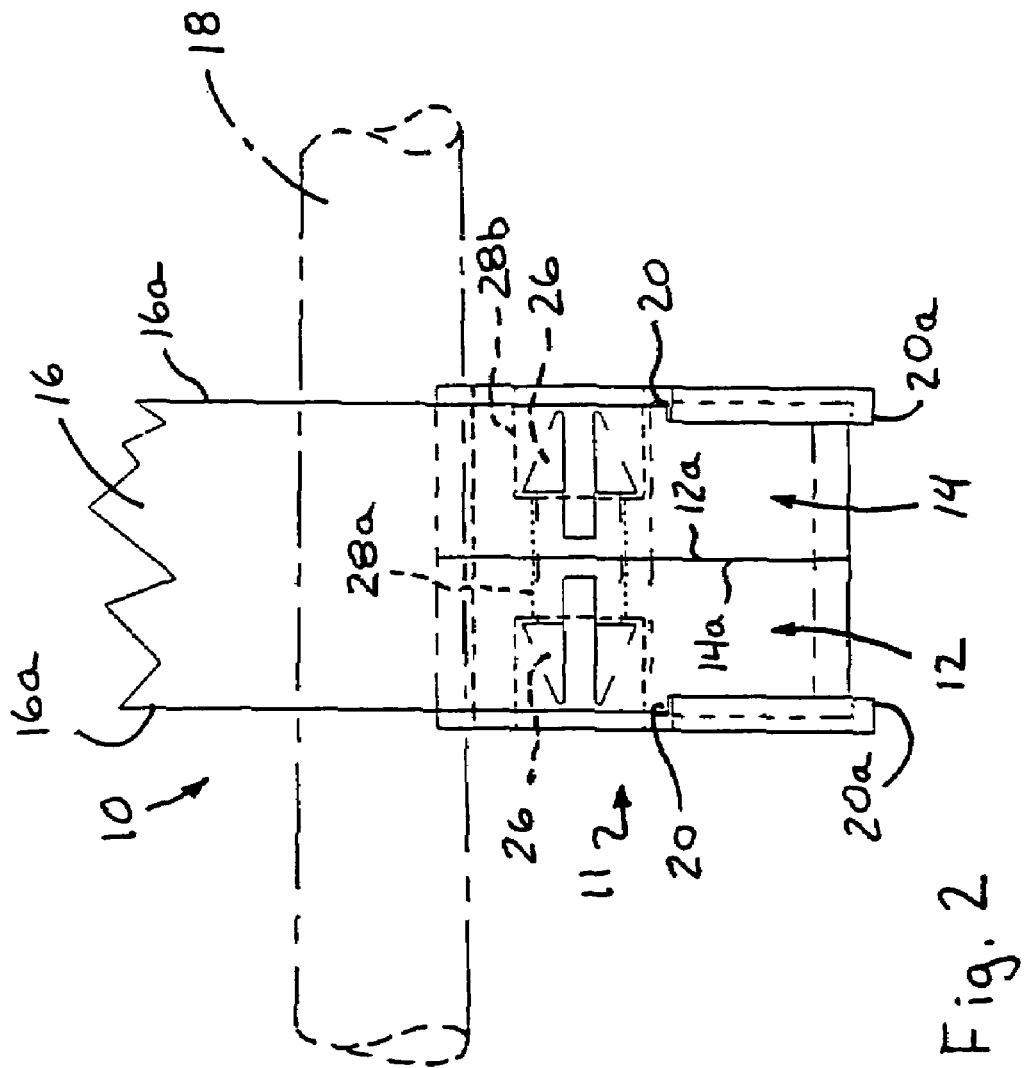
FIG. 2 is a side elevation of the pipe support assembly of FIG. 1.

Referring now to the drawings and the illustrative embodiments depicted therein, a pipe support assembly or pipe holder assembly 10 includes opposite support elements or portions or end pieces or support members 12, 14 and a hanging element or strap 16 (FIGS. 1 and 2). Support members 12, 14 are securable together and receive a portion of hanging strap 16 therebetween to retain the hanging strap 16 on or relative to support members 12, 14. Pipe support assembly 10 may be positioned so that support members 12, 14 are generally beneath a section of pipe 18, and hanging strap 16 may be secured to an overhead structure (not shown) to hang and support the section of pipe 18 from the overhead structure. The support members 12, 14 may be readily secured or joined or snapped together about the portion of hanging strap 16 to retain support members 12, 14 relative to hanging strap 16 without further manual holding or additional fasteners or the like being required to hold support members 12, 14 to hanging strap 16. The joined support members 12, 14 thus define a support body 11 that is substantially secured to the hanging strap and that supports the section of pipe. Pipe support assembly 10 thus may be readily assembled and positioned generally beneath the section of pipe 18, whereby one or both ends of hanging strap 16 may be secured or fastened to the overhead structure to complete the hanging process.

Support members 12, 14 may comprise a plastic or polymeric material and may generally snap together or may be otherwise joined to define a support body for supporting and spacing the pipe section from the hanging strap 16. Other materials for the support members may be used without affecting the scope of the present invention. Preferably, each support member 12, 14 is substantially identical to the other, such that the support members may comprise common parts. The support members thus may be reversed to face each other and may then be readily secured or joined together about the hanging strap 16, as discussed below. However, the support members may be different parts that are joinable together, without affecting the scope of the present invention.

As best shown in FIGS. 2 and 4, each support member 12, 14 includes a groove or channel 20 formed along a portion of the support members. Groove or channel 20 may comprise a generally curved or arcuately shaped channel (as best seen in FIGS. 1 and 3) extending along a lower portion of each support member 12, 14. Each support member 12, 14 further defines a lower, curved strap engaging surface 22 positioned adjacent to and generally above or at the upper end of channel or groove 20.

As support members 12, 14 are joined together, hanging strap 16 may be positioned between the opposed or facing grooves or channels 20, such that the opposite sides or edges 16a of hanging strap 16 are received within respective grooves 20 of the respective support members 12, 14. A lower lip 20a of each groove or channel 20 may extend a sufficient amount to define the groove and to substantially retain the hanging strap 16 within and between the grooves 20 of support members 12, 14 when the support members are joined together, as can be seen with reference to FIG. 2.

Although the strap engaging surface and the channel or groove are shown as a generally continuous and arcuate or curved surface and groove or channel along a lower portion of each support member 12, 14, the hanging strap may otherwise be received in or engage one or more spaced apart channel segments or lower lips or the like to retain the hanging strap relative to the support members when the support members are secured or joined together, without affecting the scope of the present invention. Also, although shown as having an arcuately curved strap engaging surface and groove along the lower portion of the support members, clearly, the support members may have or define one or more generally straight surfaces and/or grooves or channels along the lower and/or side portions of the members, without affecting the scope of the present invention.

The hanging element or strap may comprise a metallic or polymeric strap or strip that may curve or conform to the shape of the strap engaging surface when received within the grooves and when the support portions or members are joined together. Optionally, the hanging element or strap may comprise other types of elements or members that may be received in and/or retained by the support portions or members and that may extend therefrom for securing the hanging element to an overhead structure, without affecting the scope of the present invention. The hanging element or strap may be a flexible strip or member or may be a substantially rigid or non-conforming member, without affecting the scope of the present invention. One or more ends of the hanging element may extend upward from the support members for securing to the overhead structure, or the hanging element may comprise a generally continuous element or ring or the like, whereby a portion of the hanging element is received or retained at the support members and an opposite portion of the hanging element is secured to the overhead structure, without affecting the scope of the present invention.

In the illustrated embodiment, an upper portion of each support member 12, 14 defines a support surface 24 for supporting the section of pipe 18. As best shown in FIGS. 1 and 3, support surface 24 is a generally V-shaped support surface having angled support surface portions 24a, 24b. The support surface 24 is thus configured to engage and support pipe sections of various diameters. For example, and as shown in FIG. 1, the support surfaces 24 may support pipes of various diameters, such as a pipe section 18a having a diameter of approximately half an inch, or a pipe section 18b having a diameter of approximately one inch, or a pipe section 18c having a diameter of approximately two inches, or other size pipes or pipe diameters, without affecting the scope of the present invention. For example, the support surfaces may be otherwise sized or formed to receive light duty pipes having a diameter of approximately two inches or three inches or four inches or thereabouts, and/or to receive heavier duty pipes, such as pipes having a diameter of approximately six inches, eight inches, ten inches or twelve inches or thereabouts. Although exemplary sized pipes are mentioned herein, clearly the support surfaces may be formed to receive and support any other sized pipes depending on the particular application of the pipe holder assembly, without affecting the scope of the present invention. The pipes may comprise any known material, such as copper or iron or plastic or PVC material or the like, without affecting the scope of the present invention. The support members may include more or less support or strengthening ribs 32 (discussed below) between the pipe support surface and the strap engaging surface, depending on the particular size and/or shape of the support members.

In the illustrated embodiment, support members 12, 14 may snap together to define the support body 11 of pipe support assembly 10. As best shown in FIG. 4, each support member 12, 14 may include a snap fastener or projection 26 extending from the opposed surface 12a, 14a, and an aperture or opening or receiving portion 28 extending generally through support member 12, 14. Projection 26 may include a pair of angled or tapered and spaced apart end portions 26a, while aperture 28 may comprise a stepped opening or aperture having a first opening 28a that has a smaller diameter than the second opening 28b (FIG. 4). When support members 12, 14 are positioned adjacent to one another with their opposed surfaces 12a, 14a facing one another, the protrusions or projections 26 of each support member may generally align with the opening 28 of the other support member. As the support members 12, 14 are pressed together, the tapered ends 26a of protrusions 26 function to guide the protrusions into the smaller diameter openings 28a, while the space or gap between the ends 26a allows them to flex inward to fit the ends 26a of protrusions 26 through the narrowed opening 28a of the other support member. When the support members are pressed sufficiently toward one another, the ends 26a may be positioned within the larger diameter opening 28b, such that the ends may flex back to their initial orientation, whereby the ends engage the stepped wall of the larger diameter opening, and thus retain the protrusions within the openings to secure the support members together.

Accordingly, support members 12, 14 may be readily engaged or joined and secured together via pressing the support members toward one another to snap the support members together to define the support body 11. When it is desired to snap the support members together, the hanging strap or element may first be positioned along one of the support members and generally along the groove 20 of one of the support members. The other support member may then be aligned with the first support member and also aligned with the opposite side or edge of the hanging strap 16, such that the hanging strap 16 is received within the channel or groove 20 of the other support member as the support members are pressed toward one another and into engagement with one another. The support members 12, 14 may then be snapped together or joined to retain hanging strap 16 within and along grooves 20 of support members 12, 14 and generally along strap engaging surface 22 of support members 12, 14. The support assembly 10 may then be positioned generally beneath a section of pipe 18 and raised upward until pipe 18 engages support surface 24 of support members 12, 14. When the pipe section 18 and support assembly 10 are positioned at the desired height, the upper end or ends of hanging strap 16 may be secured to the overhead structure via any known means, such as, for example, via nails or bolts or staples or the like securing the hanging strap to an overhead structure, such as a beam or joist or the like.

In the illustrated embodiment of FIGS. 1-4, the support members 12, 14 are common parts and are generally hollow, with openings or apertures 30 formed therethrough, and with strengthening ribs or walls 32 formed to span the openings 30 between the support surface 24 and the grooves 20 and strap engaging surface 22. However, it is envisioned that a generally continuous wall across the support members (such as at or across their outer end or ends) may be advantageous for applications where caulk may be applied along the support members, such as by insulation installers or the like.

For example, and as shown in FIGS. 5-7, a support member 112 may include a generally continuous wall or surface 134 across one end of the support member. The wall 134 may be at one end of the support member, such as at the outside end that will be facing away from the other support member when the support members are engaged with one another. The other end of the support member may be open, so that the support member defines one or more cavities 130 that are defined by or separated by or spanned by one or more strengthening webs or ribs or walls 132, such as in a similar manner as described above with respect to support members 12, 14. The support member 112 may otherwise be substantially similar to the support members described above, such that a detailed discussion of the support members will not be repeated herein. The similar components or portions of the support members are referenced in FIGS. 5-7 with the same reference numbers as were used in FIGS. 1-4, but with 100 added to each reference number.

Similar to the support members described above, the support member 112 may be joined with another common support member or a different but corresponding support member to retain the strap (not shown in FIGS. 5-7) to the support members and to provide a support surface for supporting the pipe thereon. The support surface may be cooperatively defined by both support members, or the support surface may be defined on only one of the support members (such as in applications where the support members are different parts). When joined together, the end of the support member provides a generally continuous wall to provide a surface for caulking or for other applications, as may be desired depending on the particular use of the support members.

Although shown and described as snapped together plastic components, it is envisioned that the support members of the present invention may comprise other materials, such as metallic materials or the like, and/or may be otherwise joined together, such as via fasteners or bolts or screws or tape or Velcro or the like, or via fusing or melting or adhering or bonding the members together, without affecting the scope of the present invention. Also, although shown and described above as being common support members joined together, the two members or portions be different components, and may cooperate to define the pipe support surface, or one member or portion may define the pipe support surface, while the other member or portion cooperates to define the receiving or retaining portion for receiving and/or retaining the hanging element at or along the support members or portions.

For example, it is envisioned that the support assembly of the present invention may include different support members, such as one support member that defines a support surface and a strap receiving portion, and another support member that defines another strap receiving portion, where the support members may engage one another to retain the strap therebetween. For example, a smaller second support member may be provided that functions to retain the support strap between the first and second support members, but that does not provide a portion of the pipe support surface. Such an embodiment may result in reduced material in making the parts, but an increase in part numbers due to the non-common members or parts. Also, although shown as a generally V-shaped or shallow V-shaped support surface, the support members of the present invention may individually and/or cooperatively define other shaped support surfaces, such as curved or arcuately-shaped support surfaces or the like, without affecting the scope of the present invention.

It is also envisioned that the pipe support assembly may comprise a single support portion or member integrally or unitarily molded or otherwise formed, without affecting the scope of the present invention. The strap or hanging element may be insert molded within or through a portion of the unitary support portion or member, or the strap or hanging element may readily attach to the unitary support portion or member, such as via snapping or sliding or otherwise introducing the strap into a channel or groove along the unitary support portion or member. Such an embodiment may provide a pre-assembled or pre-formed support assembly if desired.

Figure 8:
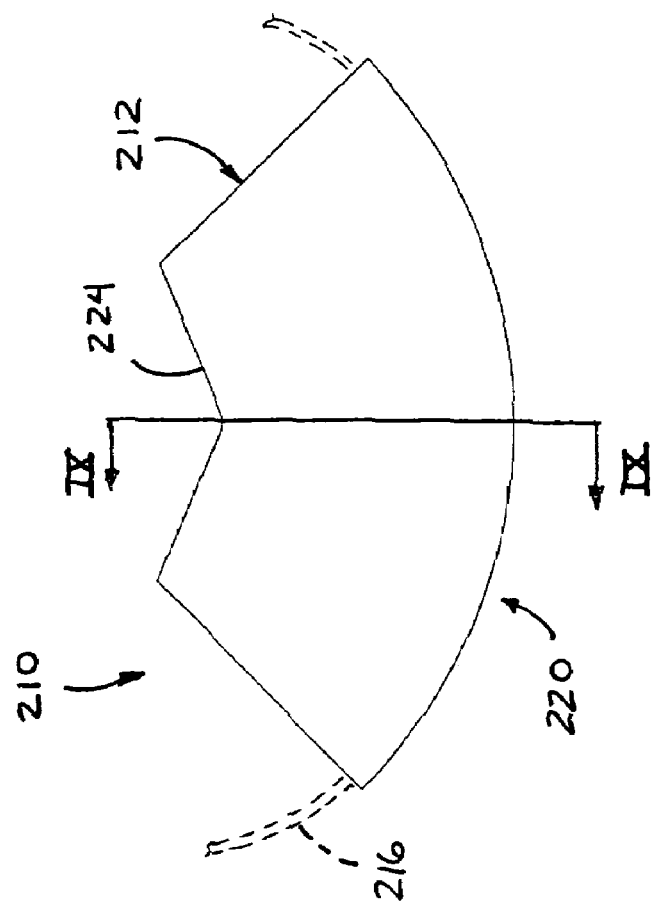
FIG. 8 is a side elevation of another pipe support assembly of the present invention.
Figure 9:
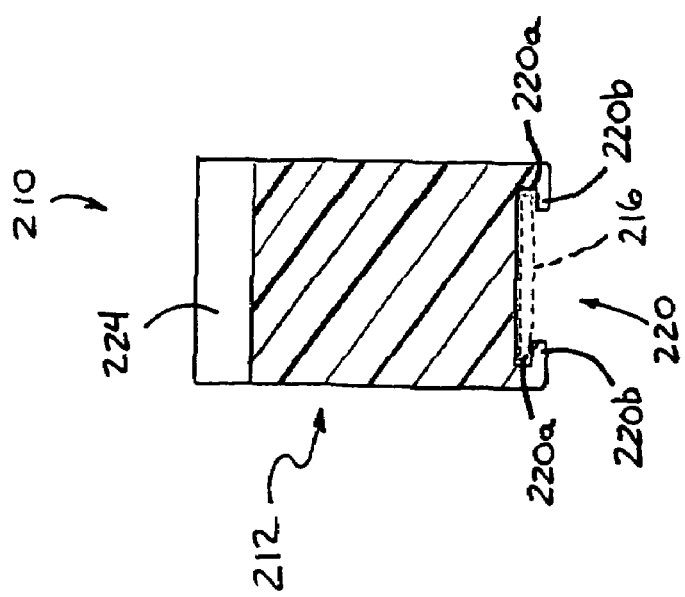
FIG. 9 is a sectional view of the pipe support assembly taken along the line IX-IX in FIG. 8.

For example, and as shown in FIGS. 8 and 9, a pipe support assembly 210 may include a unitary support member or portion 212, which may define a pipe support surface 224 and a receiving or retaining portion 220 for receiving and/or retaining a hanging element 216 therein or thereal-ong. The receiving or retaining portion 220 may define opposite channels or grooves or recesses 220a and retaining tabs 220b for receiving and retaining the hanging element along and at least partially within the grooves or recesses 220a. The hanging element 216 may be inserted or fed into and along the recesses, or the retaining tabs may flex to allow the hanging element or strap to snap or otherwise enter into the recesses and be retained therein by the tabs. Optionally, the unitary support member or portion may be molded at least partially around the hanging element to form the support member or portion at least partially around the hanging element, such as by insert molding or the like, without affecting the scope of the present invention.

The support member may comprise a generally solid polymeric or plastic member (such as shown in FIG. 9) or may include cavities or recesses therein or therethrough, similar to the support members discussed above, to reduce the weight and/or enhance the strength and/or molding process of the support member or portion. The support member 212 and pipe support assembly may otherwise be substantially similar to the support members and pipe support assemblies discussed above, such that a detailed discussion of the support members and pipe support assemblies will not be repeated herein.

Therefore, the present invention provides a pipe support or holding assembly for holding or supporting a section of pipe from an overhead structure of a building or the like. The support members of the pipe support assembly may be readily joined or secured together with the hanging strap substantially retained relative to the support members, such that the pipe support assembly may be positioned at and generally beneath a section of pipe. The pipe support assembly may be positioned at a desired location by a single operator and without requiring additional fasteners or holding means or other assistance in holding the support assembly together at the pipe section while the hanging strap is secured in place relative to the overhead structure. The present invention thus provides an easy and effective means for supporting and hanging a pipe relative to an overhead structure of a building or the like, and avoids the need for wooden blocks or the like having to be manually held in place while the straps are secured to the overhead structure.

Changes and modifications to the specifically described embodiments may be carried out without departing from the principles of the present invention, which is intended to be limited only by the scope of the appended claims, as interpreted according to the principles of patent law.

The embodiments of the invention in which an exclusive property or privilege is claimed are defined as follows:

1. A pipe support assembly for supporting a section of pipe from an overhead structure, said pipe support assembly comprising:
    a first support portion;
    a second support portion, at least one of said first and second support portions defining a pipe support surface for supporting the section of pipe, said first and second support portions cooperating to define a curved hanging portion generally radially opposed from said pipe support surface;
    a curved hanging element for hanging said first and second support portions from the overhead structure, said hanging element being disposed at least partially along said hanging portion of said first and second support portions; and
    said first and second support portions being joined together to retain at least a portion of said hanging element at least partially along said hanging portion and at least partially within and at least partially between said first and second support portions, wherein at least a portion of said first and second support portions at least partially overlaps said portion of said hanging element to limit radial movement of said portion of said hanging element relative to said first and second support portions when said first and second support portions are joined together to retain said portion of said hanging element, at least another portion of said hanging element being securable to the overhead structure to hang said first and second support portions and the section of pipe from the overhead structure.

2. The pipe support assembly of claim 1, wherein said first and second support portions are joined via an engaging member of said first support portion engaging a corresponding receiving portion of said second support portion.

3. The pipe support assembly of claim 1, wherein said first support portion has a first groove formed along a portion of said first support portion and said second support portion has a second groove formed along a portion of said second support portion, said first and second grooves receiving respective portions of said hanging element and retaining said hanging element between said first and second support portions when said first and second support portions are joined together.

4. The pipe support assembly of claim 3, wherein said first and second grooves are generally arcuately shaped or curved along said first and second support portions.

5. The pipe support assembly of claim 1, wherein said first and second support portions comprise common support portions.

6. The pipe support assembly of claim 1, wherein said first and second support portions comprise a polymeric material.

7. The pipe support assembly of claim 1, wherein said first support portion has a first support surface and said second support portion has a second support surface, said first and second support surfaces cooperating to define said pipe support surface when said first and second support portions are joined together.

8. The pipe support assembly of claim 1, wherein said at least one of said first and second support portions includes a generally continuous wall at an end thereof that is opposite to the end that engages the other of said first and second support portions.

9. A pipe support assembly for supporting a section of pipe from an overhead structure, said pipe support assembly comprising:
a first support portion;
a second support portion, at least one of said first and second support portions defining a pipe support surface for supporting the section of pipe;
said first and second support portions being joined via an engaging member of said first support portion engaging a corresponding receiving portion of said second support portion, and wherein said engaging member engages said receiving portion via a snap connection; and
a hanging element for hanging said first and second support portions from the overhead structure, said first and second support portions being joined together to retain at least a portion of said hanging element at least partially within and at least partially between said first and second support portions, at least another portion of said hanging element being securable to the overhead structure to hang said first and second support portions and the section of pipe from the overhead structure, said first and second support portions snapping together around said at least a portion of said hanging element to retain said at least a portion of said hanging element within and between said first and second support portions.

10. A pipe support assembly for supporting a section of pipe from an overhead structure, said pipe support assembly comprising:
a first support portion;
a second support portion, at least one of said first and second support portions defining a pipe support surface for supporting the section of pipe;
said first and second support portions being joined via an engaging member of said first support portion engaging a corresponding receiving portion of said second support portion, wherein said first and second support portions comprise common support portions, and wherein said engaging member of said first support portion engages said receiving portion of said second support portion while an engaging member of said second support portion engages a receiving portion of said first support portion; and
a hanging element for hanging said first and second support portions from the overhead structure, said first and second support portions being joined together to retain at least a portion of said hanging element at least partially within and at least partially between said first and second support portions, at least another portion of said hanging element being securable to the overhead structure to hang said first and second support portions and the section of pipe from the overhead structure.

11. A pipe support assembly for supporting a section of pipe from an overhead structure, said pipe support assembly comprising:
at least one support portion defining a pipe support surface for supporting the section of pipe, said at least one support portion comprising a polymeric material, said at least one support portion defining a retaining portion that is generally opposite said pipe support surface; and
a hanging element for hanging said at least one support portion from the overhead structure, said hanging element comprising a hanging strap, said retaining portion of said at least one support portion receiving at least a portion of said hanging element and retaining said portion of said hanging element at said at least one support portion, at least one other portion of said hanging element being securable relative to the overhead structure to hang said at least one support portion and the section of pipe from the overhead structure, said retaining portion of said at least one support portion comprising a lip that at least partially overlaps said hanging element to limit radial movement of said portion of said hanging element relative to said at least one support portion and the pipe when said portion of said hanging element is retained at said retaining portion of said at least one support portion.

12. The pipe support assembly of claim 11, wherein said at least one support portion comprises first and second support portions that are joinable together to receive and retain said at least a portion of said hanging element.

13. The pipe support assembly of claim 12, wherein each of said first and second support portions includes a respective retaining portion for receiving and retaining a respective portion of said hanging element when said first and second support portions are joined together.

14. The pipe support assembly of claim 13, wherein said first and second support portions snap together around at least a portion of said hanging element to secure said hanging element within and between said first and second receiving portions.

15. The pipe support assembly of claim 11, wherein said retaining portion includes flexible tabs that flex to receive said hanging element in a recess of said retaining portion.

16. A pipe support assembly for supporting a section of pipe from an overhead structure, said pipe support assembly comprising:
at least one support portion defining a pipe support surface for supporting a section of pipe, said at least one support portion comprising a polymeric material, said at least one support portion defining a retaining portion that is generally opposite said pipe support surface; and
a hanging element for hanging said at least one support portion from the overhead structure, said hanging element being disposed at least partially along said retaining portion, said retaining portion of said at least one support portion comprising opposed grooves for receiving at respective portions of said hanging element and retaining said hanging element at said at least one support portion, at least one portion of said hanging element being securable to the overhead structure to hang said at least one support portion and the section of pipe from the overhead structure, wherein said at least one support portion is molded at least partially around said hanging element, whereby said respective portions of said hanging element are received in said grooves and respective lips at said grooves of said retaining portion overlap said respective portions of said hanging element to limit movement of said hanging element relative to said at least one support portion in a radial direction relative to the section of pipe supported by said pipe support assembly.

17. A pipe support assembly for supporting a section of pipe from an overhead structure, said pipe support assembly comprising:
a first support portion having a first receiving portion and a first joining portion;

a second support portion having a second receiving portion and a second joining portion, at least one of said first and second support portions defining a pipe support surface for supporting the section of pipe, said second joining portion being engagable with said first joining portion to join said first and second support portions together, said first and second joining portions being longitudinally opposed with respect to a longitudinal axis of the section of pipe when said pipe support assembly supports the section of pipe; and a hanging element for hanging said first and second support portions from the overhead structure, said first and second receiving portions comprising spaced apart and generally opposed grooves for receiving opposite side portions of said hanging element and retaining said hanging element at least partially within and at least partially between said first and second receiving portions when said first and second joining portions of said first and second support portions are joined, at least one other portion of said hanging element being securable to the overhead structure.

18. The pipe support assembly of claim 17, wherein said first and second support portions are engagable via an engaging member of said first support portion engaging a corresponding receiving portion of said second support portion.

19. The pipe support assembly of claim 18, wherein said engaging member engages said receiving portion via a snap connection.

20. The pipe support assembly of claim 18, wherein said first and second support portions comprise common support portions, said engaging member of said first support portion engages said receiving portion of said second support portion while an engaging member of said second support portion engages a receiving portion of said first support portion.

21. The pipe support assembly of claim 17, wherein said first and second receiving portions comprise grooves extending at least partially along a portion of said first and second support portions.

22. The pipe support assembly of claim 17, wherein said pipe support surface comprises a generally V-shaped surface.

23. The pipe support assembly of claim 17, wherein said first support portion has a first support surface and said second support portion has a second support surface, said first and second support surfaces cooperating to define said pipe support surface when said first and second support portions are engaged.

24. The pipe support assembly of claim 17, wherein at least one of said first and second support portions includes a generally continuous wall at an end thereof that is opposite to the end that engages the other of said first and second support portions.

25. A pipe support assembly for supporting a section of pipe from an overhead structure, said pipe support assembly comprising:

a first support portion having a first receiving portion;

a second support portion having a second receiving portion, at least one of said first and second support portions defining a pipe support surface for supporting the section of pipe; and a hanging element for hanging said first and second support portions from the overhead structure, said first and second receiving portions receiving opposite portions of said hanging element and retaining said hanging element between said first and second support portions when said first and second support portions are joined, at least one portion of said hanging element being securable to the overhead structure, wherein said first and second support portions snap together around at least a portion of said hanging element to secure said hanging element within and between said first and second receiving portions.

* * * * *

UNITED STATES PATENT AND TRADEMARK OFFICE
CERTIFICATE OF CORRECTION

PATENT NO. : 7,281,689 B1 Page 1 of 1
APPLICATION NO. : 10/983987
DATED : October 16, 2007
INVENTOR(S) : Michael R. Johnston It is certified that error appears in the above-identified patent and that said Letters Patent is hereby corrected as shown below:

Column 8
Line 66, delete "said" after "wherein"

Column 10
Column 47, delete "at" after "receiving"

Signed and Sealed this

Sixth Day of January, 2009

JON W. DUDAS
*Director of the United States Patent and Trademark Office*